(12) United States Patent
Goyal et al.

(10) Patent No.: US 11,892,955 B2
(45) Date of Patent: Feb. 6, 2024

(54) SYSTEM AND METHOD FOR BYPASS MEMORY READ REQUEST DETECTION

(71) Applicant: Microchip Technology Inc., Chandler, AZ (US)

(72) Inventors: Sanjay Goyal, Roseville, CA (US); Larrie Simon Carr, Kelowna (CA); Patrick Bailey, Port Coquitlam (CA)

(73) Assignee: Microchip Technology Inc., Chandler, AZ (US)

(*) Notice: Subject to any disclaimer, the term of this patent is extended or adjusted under 35 U.S.C. 154(b) by 120 days.

(21) Appl. No.: 17/741,282

(22) Filed: May 10, 2022

(65) Prior Publication Data

US 2022/0382688 A1   Dec. 1, 2022

Related U.S. Application Data

(60) Provisional application No. 63/195,455, filed on Jun. 1, 2021.

(51) Int. Cl.
| | |
|---|---|
| *G06F 13/16* | (2006.01) |
| *G06F 11/10* | (2006.01) |
| *G06F 13/42* | (2006.01) |

(52) U.S. Cl.
CPC ...... *G06F 13/1621* (2013.01); *G06F 11/1004* (2013.01); *G06F 13/1668* (2013.01); *G06F 13/4221* (2013.01)

(58) Field of Classification Search
CPC ............. G06F 13/1668; G06F 13/1621; G06F 11/1004; G06F 13/4221
USPC ........................................................ 711/154
See application file for complete search history.

(56) References Cited

U.S. PATENT DOCUMENTS

| | | |
|---|---|---|
| 6,185,713 B1 | 2/2001 | Nakamoto et al. |
| 6,188,699 B1 | 2/2001 | Lang et al. |
| 6,333,935 B1 | 12/2001 | Carr et al. |
| 6,611,519 B1 | 8/2003 | Howe |
| 7,227,876 B1 | 6/2007 | Cochran et al. |
| 7,454,425 B2 | 11/2008 | Che et al. |
| 7,468,974 B1 | 12/2008 | Carr et al. |
| 7,474,926 B1 | 1/2009 | Carr et al. |
| 7,668,925 B1 | 2/2010 | Liao et al. |
| 7,739,432 B1 | 6/2010 | Shaw et al. |
| 7,774,424 B1 | 8/2010 | Bailey et al. |
| 8,089,902 B1 | 1/2012 | Liao et al. |
| 8,116,226 B1 | 2/2012 | Liao et al. |

(Continued)

FOREIGN PATENT DOCUMENTS

TW        200805952 A        1/2008

OTHER PUBLICATIONS

PCT/US2022/028767, International Search Report and Written Opinion, European Patent Office, dated Aug. 25, 2022.

*Primary Examiner* — Christopher B Shin
(74) *Attorney, Agent, or Firm* — Glass & Associates; Molly Sauter; Kenneth Glass

(57) ABSTRACT

System and method for analyzing CXL flits at read bypass detection logic to identify bypass memory read requests and transmitting the identified bypass memory read requests over a read request bypass path directly to a transaction/application layer of the CXL memory controller, wherein the read request bypass path does not include an arbitration/multiplexing layer and a link layer of the CXL memory controller, thereby reducing the latency inherent in a CXL memory controller.

20 Claims, 10 Drawing Sheets

(56) References Cited

U.S. PATENT DOCUMENTS

| | | |
|---|---|---|
| 8,127,059 B1 | 2/2012 | Carr et al. |
| 8,429,325 B1 | 4/2013 | Onufryk et al. |
| 8,924,610 B1 | 12/2014 | Carr et al. |
| 9,262,554 B1 | 2/2016 | Bailey et al. |
| 9,280,508 B1 | 3/2016 | Tabor et al. |
| 9,329,926 B1 | 5/2016 | Clinton et al. |
| 9,336,173 B1 | 5/2016 | Sodke et al. |
| 9,397,961 B1 | 7/2016 | Bailey |
| 9,654,416 B2 | 5/2017 | Chandhoke et al. |
| 9,753,880 B1 | 9/2017 | Sodke et al. |
| 9,967,209 B2 | 5/2018 | Chandhoke et al. |
| 10,171,193 B2 | 1/2019 | Tabor et al. |
| 10,341,260 B2 | 7/2019 | Aravinthan et al. |
| 10,437,759 B2 | 10/2019 | Goyal |
| 10,614,012 B2 | 4/2020 | Goyal |
| 10,797,686 B1 | 10/2020 | Terstrup et al. |
| 2002/0118640 A1 | 8/2002 | Oberman et al. |
| 2003/0005242 A1* | 1/2003 | Dover .................. G06F 13/161 |
| | | 711/119 |
| 2003/0140202 A1 | 7/2003 | LaBerge |
| 2005/0058149 A1 | 3/2005 | Howe |
| 2007/0185877 A1 | 8/2007 | Che et al. |
| 2014/0098818 A1 | 4/2014 | Matthews et al. |
| 2014/0219087 A1 | 8/2014 | Matthews et al. |
| 2017/0201468 A1 | 7/2017 | Gabbay et al. |
| 2018/0219641 A1 | 8/2018 | Tabor et al. |
| 2018/0227247 A1 | 8/2018 | Aravinthan et al. |
| 2018/0267917 A1 | 9/2018 | Goyal |
| 2019/0213156 A1 | 7/2019 | Goyal |
| 2020/0153721 A1 | 5/2020 | Holbrook et al. |
| 2020/0259896 A1 | 8/2020 | Sachs et al. |
| 2020/0314030 A1 | 10/2020 | Goel et al. |
| 2020/0328879 A1 | 10/2020 | Makaram et al. |
| 2021/0391978 A1 | 12/2021 | Clinton et al. |
| 2022/0066636 A1* | 3/2022 | Taki ...................... G06F 3/0679 |
| 2022/0188033 A1* | 6/2022 | Cho ....................... G06F 3/0679 |
| 2023/0195368 A1* | 6/2023 | Agarwal ................ G06F 3/061 |
| | | 711/154 |
| 2023/0342073 A1* | 10/2023 | Lee ....................... G06F 3/0679 |

* cited by examiner

CXL.cache/CXL.mem Flit Header Definition

| Field Name | Brief Description | Size |
|---|---|---|
| Type | This field distinguishes between a Protocol or a Control Flit | 1 |
| Ak | This is an acknowledgment of 8 successful flit transfers Reserved for Retry, and Init control flits | 1 |
| BE | Byte Enable (Reserved for control flits) | 1 |
| Sz | Size (Reserved for control flits) | 1 |
| ReqCrd | Request Credit Return Reserved for Retry, and Init control flits | 4 |
| DataCrd | Data Credit Return Reserved for Retry, and Init control flits | 4 |
| RspCrd | Response Credit Return Reserved for Retry, and Init control flits | 4 |
| Slot 0 | Slot 0 Format Type (Reserved for control flits) | 3 |
| Slot 1 | Slot 1 Format Type (Reserved for control flits) | 3 |
| Slot 2 | Slot 2 Format Type (Reserved for control flits) | 3 |
| Slot 3 | Slot 3 Format Type (Reserved for control flits) | 3 |
| RSVD | Reserved | 4 |
| Total | | 32 |

FIG. 2

Slot Format Field Encoding

| Slot Format Encoding | H2D/M2S | | D2H/S2M | |
|---|---|---|---|---|
| | Slot 0 | Slots 1, 2 and 3 | Slot 0 | Slots 1, 2 and 3 |
| 000 | H0 | G0 | H0 | G0 |
| 001 | H1 | G1 | H1 | G1 |
| 010 | H2 | G2 | H2 | G2 |
| 011 | H3 | G3 | H3 | G3 |
| 100 | H4 | G4 | H4 | G4 |
| 101 | H5 | G5 | H5 | G5 |
| 110 | H6 | RSVD | H6 | G6 |
| 111 | RSVD | RSVD | RSVD | RSVD |

FIG. 3

H2D/M2S Slot Formats

| Format to Req Type Mapping | H2D/M2S | |
|---|---|---|
| | Type | Size |
| H0 | CXL.cache Req + CXL.cache Resp | 96 |
| H1 | CXL.cache Data Header + 2 CXL.cache Resp | 88 |
| H2 | CXL.cache Req + CXL.cache Data Header | 88 |
| H3 | 4 CXL.cache Data Header | 96 |
| H4 | CXL.mem RwD Header | 87 |
| H5 | CXL.mem Req Only | 87 |
| H6 | MAC slot used for link integrity. | 96 |
| G0 | CXL.cache/ CXL.mem Data Chunk | 128 |
| G1 | 4 CXL.cache Resp | 128 |
| G2 | CXL.cache Req + CXL.cache Data Header + CXL.cache Resp | 120 |
| G3 | 4 CXL.cache Data Header + CXL.cache Resp | 128 |
| G4 | CXL.mem Req + CXL.cache Data Header | 111 |
| G5 | CXL.mem RwD Header + CXL.cache Resp | 119 |

FIG. 4

FROM 520
OF FIG. 5A

WHEN A READ REQUEST QUEUE OF THE CXL MEMORY CONTROLLER IS EMPTY, GENERATING A MEMORY READ COMMAND ON AN INTERFACE OF A MEMORY DEVICE ATTACHED TO THE CXL MEMORY CONTROLLER IN RESPONSE TO THE BYPASS MEMORY READ REQUEST RECEIVED AT THE TRANSACTION/APPLICATION LAYER OF THE CXL MEMORY CONTROLLER (OPT. GENERATING AN ACTIVATE COMMAND ON THE MEMORY DEVICE INTERFACE PRIOR TO GENERATING THE MEMORY READ COMMAND ON THE MEMORY DEVICE INTERFACE)
525

RECEIVING READ DATA FROM THE MEMORY DEVICE AT THE TRANSACTION/APPLICATION LAYER IN RESPONSE TO THE MEMORY READ COMMAND
530

WHEN THERE IS A LINK LAYER MEMORY READ REQUEST AT THE TRANSACTION/APPLICATION LAYER THAT MATCHES THE BYPASS MEMORY READ REQUEST THAT GENERATED THE MEMORY READ COMMAND, FORWARDING THE READ DATA RECEIVED AT THE TRANSACTION/APPLICATION LAYER TO THE LINK LAYER OF THE CXL MEMORY CONTROLLER (OPT. DISCARDING THE LINK LAYER MEMORY READ REQUEST THAT MATCHES THE BYPASS MEMORY READ REQUEST THAT GENERATED THE MEMORY READ COMMAND)
535

FIG. 5B

FROM 825
OF FIG. 8A

RECEIVING READ DATA FROM THE MEMORY DEVICE AT THE TRANSACTION/APPLICATION LAYER IN RESPONSE TO THE MEMORY READ COMMAND
830

WHEN THERE IS A LINK LAYER MEMORY READ REQUEST AT THE TRANSACTION/APPLICATION LAYER THAT MATCHES THE BYPASS MEMORY READ REQUEST THAT GENERATED THE MEMORY READ COMMAND, FORWARDING THE READ DATA RECEIVED AT THE TRANSACTION/APPLICATION LAYER TO THE LINK LAYER OF THE CXL MEMORY CONTROLLER AND WHEN THERE IS NOT A LINK LAYER MEMORY READ REQUEST AT THE TRANSACTION/APPLICATION LAYER THAT MATCHES THE BYPASS MEMORY READ REQUEST THAT GENERATED THE MEMORY READ COMMAND, DISCARDING THE READ DATA RECEIVED AT THE TRANSACTION/APPLICATION LAYER
835

FIG. 8B

SYSTEM AND METHOD FOR BYPASS MEMORY READ REQUEST DETECTION

CROSS-REFERENCE TO RELATED APPLICATIONS

The present application claims priority to U.S. Provisional Patent Application Ser. No. 63/195,455 filed on Jun. 1, 2021, the contents of which are incorporated by reference herein in their entirety.

BACKGROUND OF THE INVENTION

Compute Express Link (CXL) is based on the Peripheral Component Interconnect Express (PCIe) Gen5 link infrastructure to provide an open interconnect standard for enabling efficient, coherent memory access between a host, such as a CPU, and a device, such as a hardware accelerator or a memory expansion device that is handling an intensive workload.

One of the primary benefits of CXL is that is allows various CPUs to access various types of memory using the same method, thereby allowing the various CPUs to utilize the same memory pool of devices. The read latency associated with memory access is critical for host CPU performance and as such, it is highly advantageous to reduce the read latency associated with CXL attached devices, such as double data rate (DDR) memory controllers.

Accordingly, what is needed in the art is a system and method that improves the read latency of CXL attached memory controllers.

SUMMARY OF THE INVENTION

In various examples, the present provides a system and method that improves the read latency of CXL attached memory controllers.

In one example, a method is provided for bypass memory read request detection, which includes, receiving a plurality of data packets at a physical layer of a CXL memory controller, deriving a plurality Compute Express Link (CXL) flow control units (flits) from the plurality of data packets received at a physical layer of a CXL memory controller, transmitting each of the received plurality of CXL flits to read bypass detection logic of the CXL memory controller and analyzing each of the plurality of CXL flits at the read bypass detection logic to identify a bypass memory read request from the plurality of CXL flits. In a particular example, analyzing each of the plurality of CXL flits at the read bypass detection logic of the CXL memory includes detecting a master to subordinate (M2S) request having a memory read operation code in the CXL flit to identify the bypass memory read request. The method further includes, transmitting the bypass memory read request over a read request bypass path directly to a transaction/application layer of the CXL memory controller, wherein the read request bypass path does not include an arbitration/multiplexing layer and a link layer of the CXL memory controller. When a read request queue of the CXL memory controller is empty, the method continues by, generating a memory read command on an interface of a memory device attached to the CXL memory controller in response to the bypass memory read request received at the transaction/application layer of the CXL memory controller, receiving read data from the memory device at the transaction/application layer in response to the memory read command and, when there is a link layer memory read request at the transaction/application layer that matches the bypass memory read request that generated the memory read command, the method concludes by forwarding the read data received at the transaction/application layer to the link layer of the CXL memory controller.

In an additional example, when there is not a link layer memory read request at the transaction/application layer that matches the bypass memory read request that generated the memory read command, the method continues by discarding the read data received at the transaction/application layer. Additionally, when the read request queue of the CXL memory controller is not empty, the method continues by not generating the memory read command on the interface of the memory device attached to the CXL memory controller and discarding the bypass memory read request. A memory read command will also not be generated on the memory device interface, and the bypass memory read request will be discarded, if an address space of the bypass memory read request is not valid.

In a particular example, the memory device attached to the CXL memory controller is a Double Data Rate (DDR) memory device.

In an additional example, a compute express link (CXL) memory controller is provided which includes read bypass detection logic to receive a plurality of CXL flits from a CXL physical layer of a CXL memory controller and to analyze each of the received plurality of CXL flits to identify a bypass memory read request from the plurality of CXL flits. In a particular example, the CXL memory controller analyzes each of the plurality of CXL flits by detecting a master to subordinate (M2S) request having a memory read operation code in the CXL flit to identify the bypass memory read request. The CXL memory controller further includes a read request bypass path, which includes the read bypass detection logic and connects the CXL physical layer to a transaction/application layer of the CXL memory controller, the read request bypass path bypassing an arbitration/multiplexing layer of the CXL memory controller and a link layer of the CXL memory controller. The transaction/application layer generates a memory read command on an interface of a memory device associated with the CXL memory controller in response to the bypass memory read request received at the transaction/application layer when a read request queue is empty, receives read data from the memory device in response to the memory read command and forwards the read data received at the transaction/application layer to the link layer when there is a link layer memory read request at the transaction/application layer that matches the bypass memory read request that generated the memory read command.

In an additional example, the CXL memory controller discards the read data received at the transaction/application layer when there is not a link layer memory read request at the transaction/application layer that matches the bypass memory read request that generated the memory read command. Additionally, the CXL memory controller does not generate the memory read command on the interface of the memory device when the read request queue is not empty and discards the bypass memory read request. The CXL memory controller also discards the bypass memory read request and does not generate the memory read command on the memory device interface when an address space of the bypass memory read request is not valid.

Accordingly, these various examples provide an improved system and method for reducing read latency for CXL attached memory controllers.

BRIEF DESCRIPTION OF THE DRAWINGS

The accompanying drawings, which are incorporated in and form a part of this specification, illustrate various examples and, together with the Detailed Description of the Invention, serve to explain principles discussed below. The drawings referred to in this brief description should not be understood as being drawn to scale unless specifically noted.

FIG. 2 is a table illustrating CXL.cache/CXL.mem Flit Header Definition in accordance with the CXL 2.0 Specification.

FIG. 3 is a table illustrating Slot Format Field Encoding in accordance with the CXL 2.0 Specification.

FIG. 4 is a table illustrating H2D/M2S Slot Formats in accordance with the CXL 2.0 Specification.

FIG. 5B is a continuation of the flow diagram of FIG. 5A illustrating an example method for reducing read latency in a CXL memory controller.

FIG. 8B is a continuation of the flow diagram of the 8A illustrating an example method for reducing read latency in a CXL memory controller and for matching link layer memory read requests to bypass memory read requests.

DETAILED DESCRIPTION OF THE INVENTION

Figure 1:
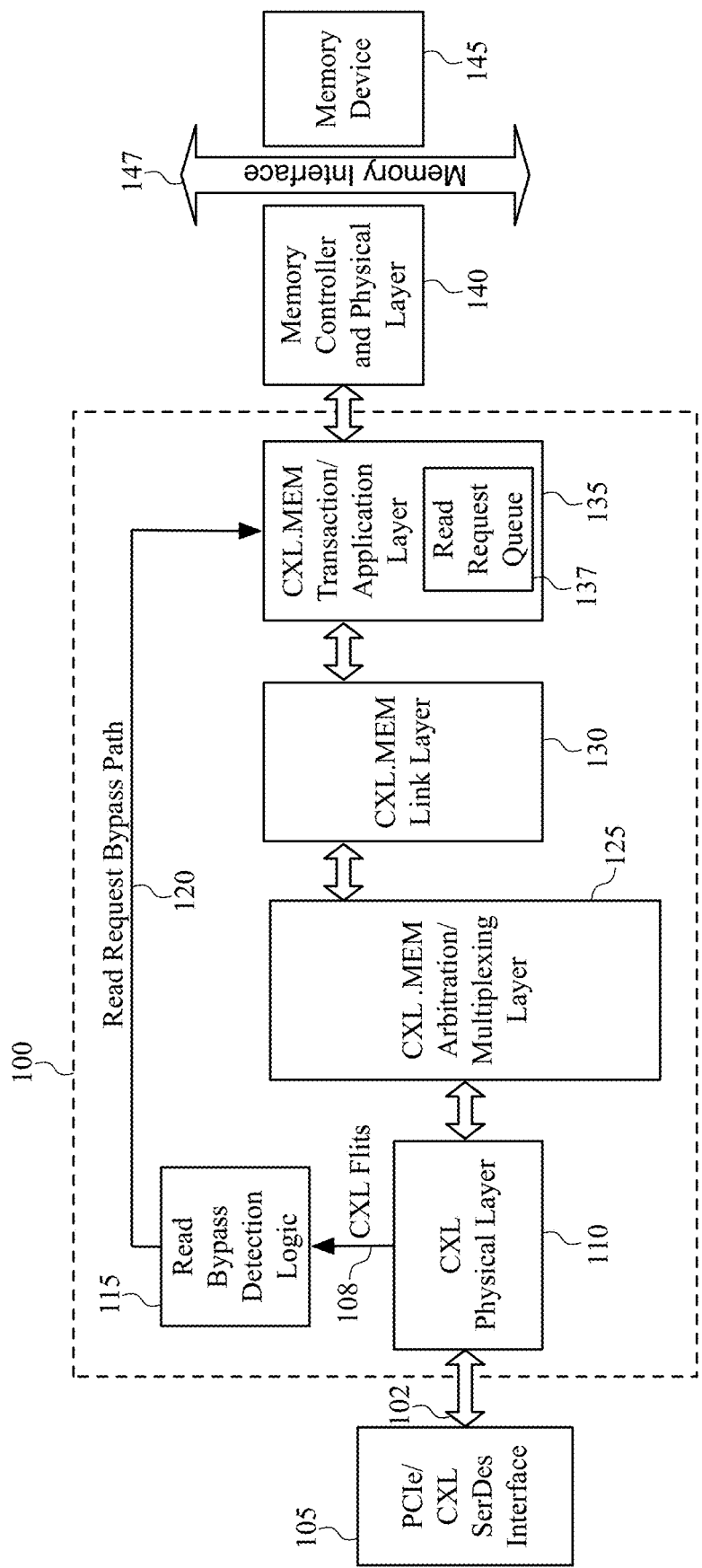
FIG. 1 is a block diagram illustrating an example CXL memory controller including read bypass detection logic.

Reference will now be made in detail to various examples, which are illustrated in the accompanying drawings. While various examples are discussed herein, it will be understood that they are not intended to be limiting. On the contrary, the presented examples are intended to cover alternatives, modifications, and equivalents, which may be included within the spirit and scope of the various examples as defined by the appended claims. Furthermore, in this Detailed Description of the Invention, numerous specific details are set forth in order to provide a thorough understanding. However, examples may be practiced without one or more of these specific details. In other instances, well known methods, procedures, components, and circuits have not been described in detail as not to unnecessarily obscure aspects of the described examples.

It will be understood that, although the terms first, second, third, without limitation, may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

CXL has been developed as a standard to provide an improved, high-speed CPU-to-device and CPU-to-memory interconnect that will accelerate next-generation data center performance and emerging computing applications, such as artificial intelligence, machine learning and other applications. CXL maintains memory coherency between the CPU memory space and the memory space of attached devices, which provides for resource sharing, thereby enabling high performance, reduced complexity and lower overall system costs.

CXL supports a set of protocols that include input/output (I/O) semantics (CXL.io), which are similar to PCIe I/O semantics, caching protocol semantics (CXL.cache), and memory access semantics (CXL.mem). The CXL.io protocol is equivalent to PCIe transport over the CXL protocol and CXL.mem is a memory access protocol that supports device-attached memory to provide a transactional interface between the CPU and the memory device. In some applications, the CXL protocols may be built upon the well-established and widely adopted PCIe infrastructure (e.g., PCIe 5.0), thereby leveraging the PCIe physical interface and enhancing the protocol with CXL to provide memory coherency between a CPU memory and an accelerator device memory.

With reference to FIG. 1, a compute express link (CXL) memory controller 100 includes, read bypass detection logic 115 to receive a plurality of CXL flits 108 from a CXL physical layer 110 of the CXL memory controller 100. The CXL flits 108 may be derived from data packets received over a PCIe/CXL serializer/deserializer (SerDes) interface 105 from a CPU or other host device.

CXL flits (flow control units) are link layer data packets formatted for use over interconnected links, such as PCIe-based or CXL-based links. In a particular example, CXL flits are known to be comprised of 528 bits, which includes 64 bytes of data followed by 2 bytes of cyclic redundancy check (CRC) to check the integrity of the data bytes. In accordance with the CXL protocol, a CXL flit begins after the protocol identification (ProtID) field. The ProtID field is used by the CXL.mem arbitration/multiplexing layer 125 to direct the CXL flit to the CXL.mem link layer 130.

With reference to FIG. 2, a CXL.cache/CXL.mem flit includes a header that carries a Type bit 200 and Slot n information, which is used to determine if the flit is a protocol flit and if it may comprise a M2S Req (Master to Subordinate request). With reference to FIG. 3 and FIG. 4, if Slot 0 has a field value of 3'b101 300, it indicates that the flit is H5 format 400 and is carrying a CXL.mem Req.

The M2S Req itself is only 87 bits. Adding header bytes of 4 bytes plus Protocol ID of 2 bytes, means that it is necessary to collect a total of 135 bits (48 bits+87 bits) to be able to detect a memory read request in the CXL flit.

In standard operation of a CXL controller, that does not implement the read bypass path 120 of the present examples, which however has other elements which are found in CXL memory controller 100, CXL flits received at a physical layer of the CXL memory controller 110 that are carrying a memory read request (CXL.mem Req.) are transmitted to a CXL.mem arbitration/multiplexing layer 125 and the CXL.mem arbitration/multiplexing layer 125 then transmits the CXL flits to the CXL.mem link layer 130. The CXL.mem link layer 130 checks each of CXL flits to verify that they are not all-data flits (i.e., do not contain a header) and that CRC for the CXL flit is correct. If the CXL flit passes these verifications, the CXL.mem link layer 130 then transmits the read request to a CXL.mem transaction/application layer 135. The CXL.mem transaction/application layer 135 then generates a read command and forwards the read command to a memory controller and physical layer 140. The memory controller and physical layer 140 then generates a memory read command on the memory interface device 147. The memory controller and physical layer 140 also generates an activate command on the memory interface 147, if the memory device 145 page is not already open, which allows the CPU host to access the memory device 145 through the memory interface 147, as controlled by the CXL memory controller 100. In this standard implementation, undesirable latency exists in the read data path between the CXL physical layer 110 and the CXL.mem transaction/application layer 135.

As shown in FIG. 1 a read request bypass path 120, including read bypass detection logic 115, connecting the CXL physical layer 110 to the transaction/application layer 135 is implemented in the CXL memory controller 110. As shown, the read request bypass path bypasses the CXL.mem arbitration/multiplexing layer 125 of the CXL memory controller 100 and the link layer 130 of the CXL memory controller 100. The read bypass detection logic 115 receives a plurality of CXL flits 108 from the CXL physical layer 110 and analyzes each of the received plurality of CXL flits 108 to identify a bypass memory read request from the plurality of CXL flits 108. Detecting a master to subordinate (M2S) request having a memory read operation code in the CXL flit 108 identifies the bypass memory read request of the CXL flit 108. Read bypass detection logic 115, upon detection of a bypass memory read request from the plurality of CXL flits 108, forwards the bypass memory read request over the read request bypass path 120 directly to CXL.mem transaction/application layer 135.

The physical layer 110 of the CXL memory controller 100 receives a plurality of data packets 102 from the PCIe/CXL SerDes Interface 105, derives the plurality of CXL flits 108 and transmits the plurality of CXL flits 108 both to the read bypass detection logic 115 and to the CXL.mem arbitration/multiplexing layer 125 of the CXL memory controller 100. As described above, the CXL.mem arbitration/multiplexing layer 125 identifies one or more link layer memory read requests from the plurality of CXL flits and transmits the one or more link layer memory read requests to the CXL.mem link layer 130. The CXL.mem link layer 130 performs a cyclic redundancy check (CRC) on each of the one or more link layer memory read requests, transmits the link layer memory read requests that pass the CRC to the CXL.mem transaction/application layer 135 of the CXL memory controller 100 and discards the link layer memory read requests that fail the CRC.

Upon receiving a bypass memory read request from the read bypass detection logic 115, the CXL.mem transaction/application layer 135 of the CXL memory controller 100 forwards a read command to the memory controller and physical layer 140. The memory controller and physical layer 140 then generates a memory read command and a memory activate command on the memory interface 147 of a memory device 145 associated with the CXL memory controller 100 in response to the bypass memory read request received at the transaction/application layer 135 over read request bypass path 135 when a read request queue 137 is empty. The CXL.mem transaction/application layer 135 then receives read data from the memory device 145 over the memory interface 147 as controlled by the memory controller and physical layer 140 in response to the memory read command. The CXL.mem transaction/application layer 135 forwards the read data received at the CXL.mem transaction/application layer 135 to the CXL.mem link layer 130 when there is a link layer memory read request at the CXL.mem transaction/application layer 135 that matches the bypass memory read request that generated the memory read command. In a particular example, the memory controller and physical layer 140 may be a DDR memory controller and physical layer, the memory interface 147 may be a DDR interface and the memory device 145 may be a DDR device.

The CXL.mem transaction/application layer 135 does not generate the memory read command in response to the bypass memory read request when the read request queue 137 is not empty and discards the bypass memory read request. The CXL specification defines M2S Req/MemSpecReq request, which can be used to issue speculative reads to memory devices. Memory speculative reads may be issued in order to initiate a memory access before the CXL memory controller 100 has resolved any coherence issues in the memory device 145 in order to reduce latency. However, the read data can only be returned from the memory device 45 in response to the speculative read if a matching MemRd request has been received at the CXL.mem transaction/memory layer 135 of the CXL memory controller 100. In operation, upon receiving a bypass memory read request at the CXL.mem transaction/application layer 135, the CXL.mem transaction/application layer 135 does not consume a request buffer entry. The request buffer entry is needed for the link layer flow control and is expected to be consumed by the forthcoming link layer M2S request, i.e., the matching MemRd request received from the CXL.mem link layer 130. If the read request queue 137 is not empty, then, as indicated above, the transaction/application layer 135 discards the bypass memory read request. If the read request queue 137 is empty, then the bypass memory read command is forwarded directly to the memory controller and physical layer 140.

Additionally, the CXL.mem transaction/application layer 135 discards the read data received at the CXL.mem transaction/application layer in response to the bypass memory read request when there is not a link layer memory read request at the CXL.mem transaction/application layer 135 that matches the bypass memory read request. All bypass memory read requests received at the CXL.mem transaction/application layer 135 are expected to be shortly followed by an identical memory read request from the link layer 130. If the CXL.mem transaction/application layer 135 receives a memory read request from the link layer 130 and it matches a pending bypass memory read request at the CXL.mem transaction/application layer 135, then the CXL.mem transaction/application layer 135 discards the memory read request from the link layer 130 and recycles the link layer credit. As such, the CXL.mem transaction/application layer 135 forwards the read data from the memory device 145 to the link layer 130 only if a matching memory read request from the link layer 130 has been received at the CXL.mem transaction/application layer 135. If no matching memory read request from the link layer 130 has been received at the CXL.mem ransaction/application layer 135, then either the read bypass detection logic 115 erroneously detected a bypass memory read request from an all-data flit, or the CXL.mem link layer 130 detected a CRC error, or another uncorrectable error occurred in the CXL.mem link layer 130. In these cases, the CXL.mem transaction/application layer 135 discards the read data associated with the bypass memory read request. This situation is considered a non-fatal condition and the CXL.mem transaction/application layer 135 generates a debug event in response.

It is possible that the bytes following the ProtID do not contain a .mem flit with a header slot and the flit will be considered an all-data flit. In an all-data flit, the data may be aliased such that the read bypass detection logic 115 detects a nonexistent bypass memory read request. In this case, when the bypass memory read request is forwarded to the CXL.mem transaction/application layer 135, the CXL.mem transaction/application layer 135 may process the bypass memory read request and issue the read command to the memory interface 147. The read data received in response to the false detection will be subsequently discarded by the CXL.mem transaction/application layer 135. However, the probability of a false detection of this type is extremely rare, and therefore the impact to the bandwidth of the memory device 145 due to a false detection is negligible.

The CXL.mem transaction/application layer 135 also discards bypass memory read requests that do not fall within a valid address space of the memory device 145 and does not generate the memory read command on the memory device interface 147 when an address space of the bypass memory read request is not valid.

Figure 5A:
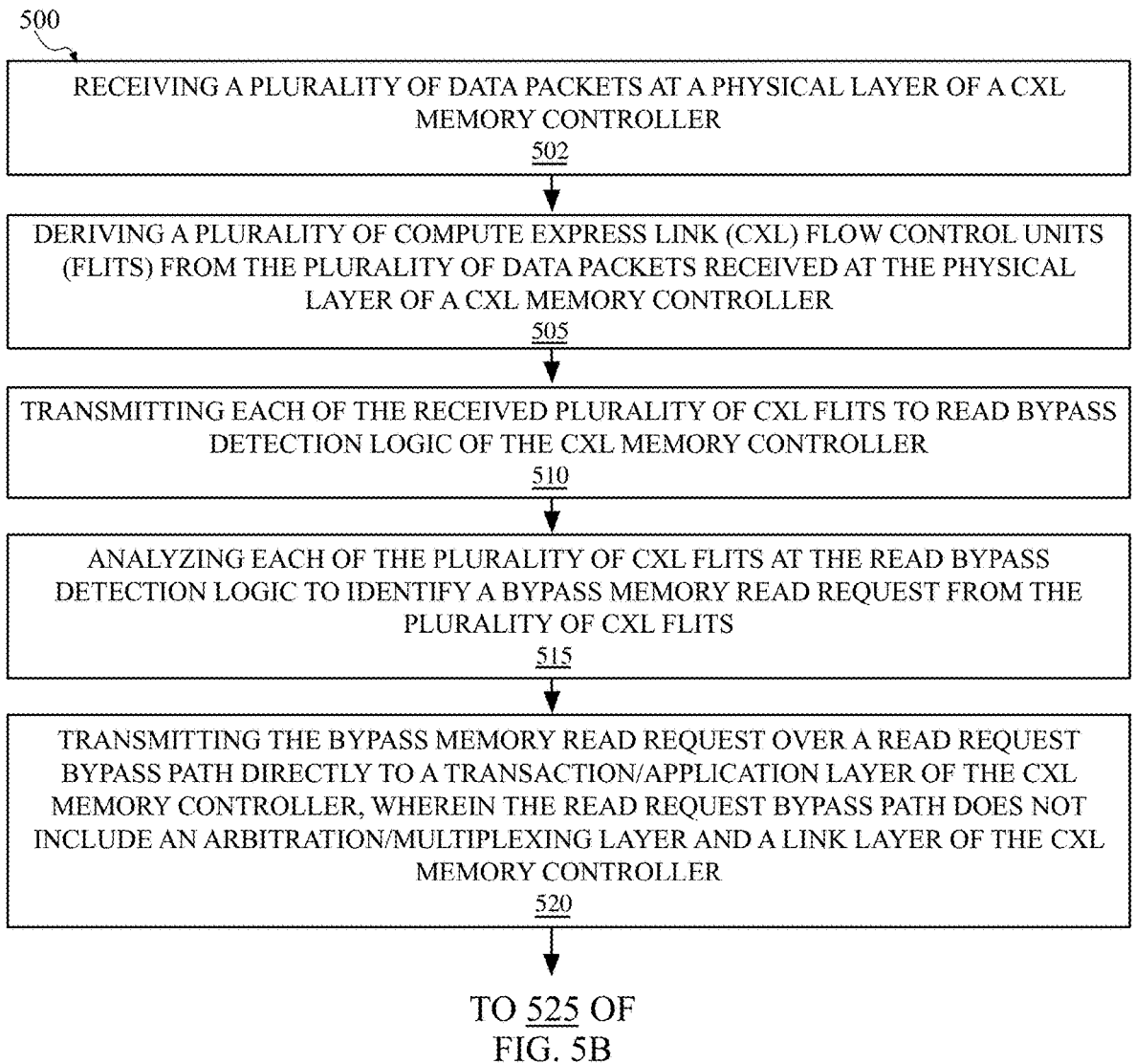
FIG. 5A is a flow diagram illustrating an example method for reducing read latency in a CXL memory controller.

FIG. 5A and FIG. 5B illustrate a flow diagram 500 of a method for reducing read latency in a CXL memory controller, such as the CXL memory controller 100 of FIG. 1.

At operation 502, the method begins by receiving a plurality of data packets at a physical layer of a CXL memory controller. With reference to FIG. 1, a physical layer 110 of the CXL memory controller 100 may receive a plurality of data packets 102 from the PCIe/CXL SerDes interface 105.

At operation 505, the method continues by deriving a plurality of Compute Express Link (CXL) flow control units (flits) from the plurality of data packets received at the physical layer of a CXL memory controller. With reference to FIG. 1, the physical layer 110 of the CXL memory controller 100 may derive a plurality of flits 108 from the plurality of received data packets 102.

At operation 510, the method continues by transmitting each of the received plurality of CXL flits to read bypass detection logic of the CXL memory controller and at operation 515 by analyzing each of the plurality of CXL flits at the read bypass detection logic to identify a bypass memory read request from the plurality of CXL flits. With reference to FIG. 1, the plurality of CXL flits 108 may be received at the read bypass detection logic 115 of the CXL memory controller 100 and the read bypass detection logic 115 may analyze each of the plurality of CXL flits 108 at the read bypass detection logic 115 to identify a bypass memory read request from the plurality of CXL flits 108.

The method continues at operation 520 by transmitting the bypass memory read request over a read request bypass path directly to a transaction/application layer of the CXL memory controller, wherein the read request bypass path does not include an arbitration/multiplexing layer and a link layer of the CXL memory controller. With reference to FIG. 1, the bypass memory read request may be transmitted over a read request bypass path 120 directly to the CXL.mem transaction/application layer 135 of the CXL memory controller 100, thereby bypassing the CXL.mem arbitration/multiplexing layer 125 and the CXL.mem link layer 130.

At operation 525, the method continues, when a read request queue of the CXL memory controller is empty, generating a memory read command on an interface of a memory device attached to the CXL memory controller in response to the bypass memory read request received at the transaction/application layer of the CXL memory controller. With reference to FIG. 1, when a read request queue 137 of the CXL memory controller 100 is empty, in response to the bypass memory read request a read command may be generated by the CXL.mem transaction/layer 135 and forwarded to the memory controller and physical layer 140. The memory controller and physical layer 140 may then generate a memory read command on the memory interface 147 of a memory device 145 in response to the bypass memory read request received at the CXL.mem transaction/application layer 135 of the CXL memory controller 100. The memory controller and physical layer 140 may also generate an activate command on the memory interface 147 prior to generating the memory read command on the memory interface, if the memory device page is not already open.

At operation 530, the method continues by receiving read data from the memory device at the transaction/application layer in response to the memory read command and the method concludes at operation 535, when there is a link layer memory read request at the transaction/application layer that matches the bypass memory read request that generated the memory read command, forwarding the read data received at the transaction/application layer to the link layer of the CXL memory controller. Optionally, if there is not a link layer memory read request at the transaction/application layer that matches the bypass memory read request that generated the memory read command, the read data received at the transaction/application layer is discarded. With reference to FIG. 1, read data received from the memory device 145 at the CXL.mem transaction/application layer 135 in response to the memory read command is forwarded to the CXL.mem link layer 130 of the CXL memory controller 100 when there is a link layer memory read request at the CXL.mem transaction/application layer 135 that matches the bypass memory read request that generated the memory read command.

Figure 6A:
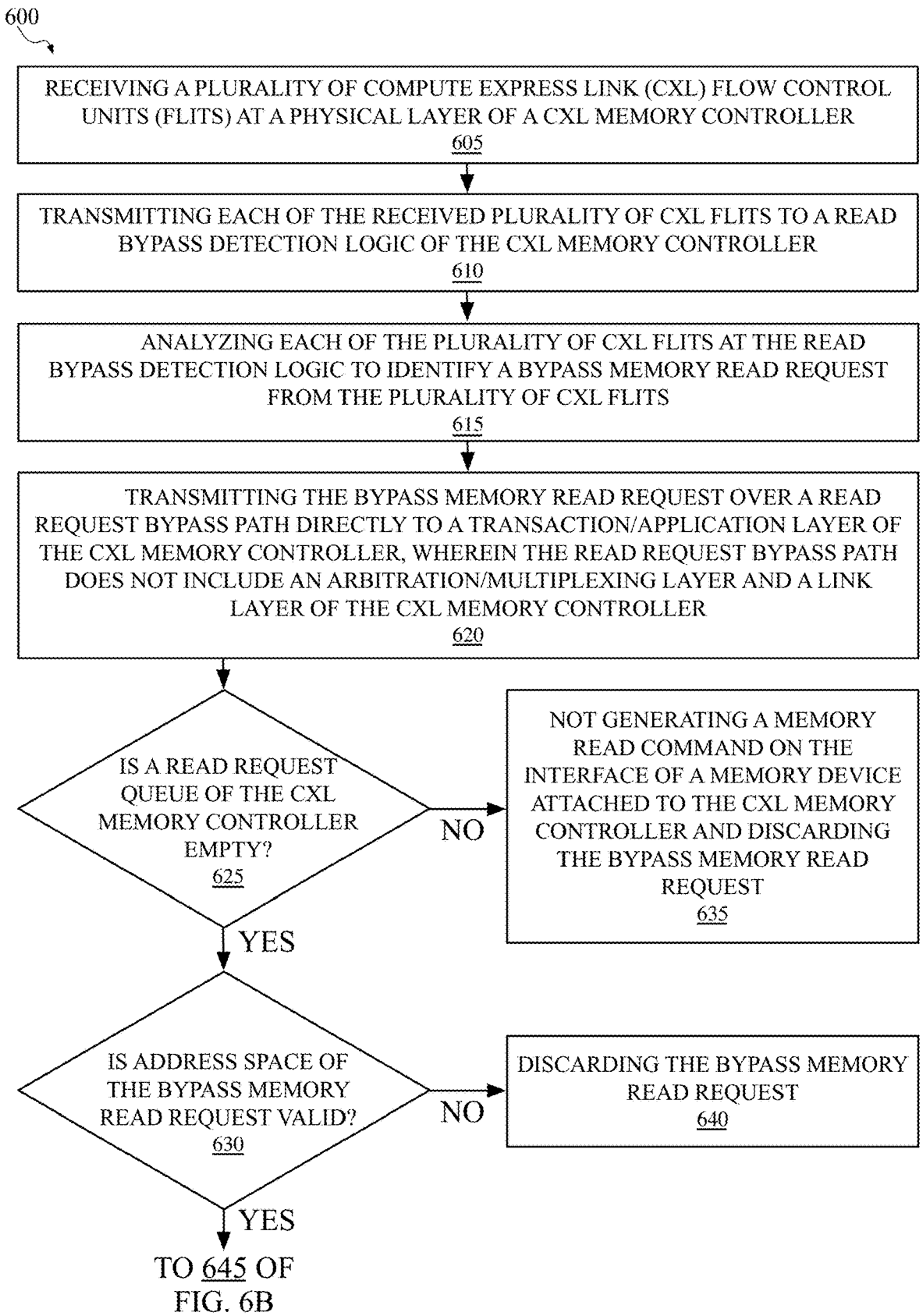
FIG. 6A is a flow diagram illustrating an example method for reducing read latency in a CXL memory controller and for selectively discarding bypass memory read requests.
Figure 6B:
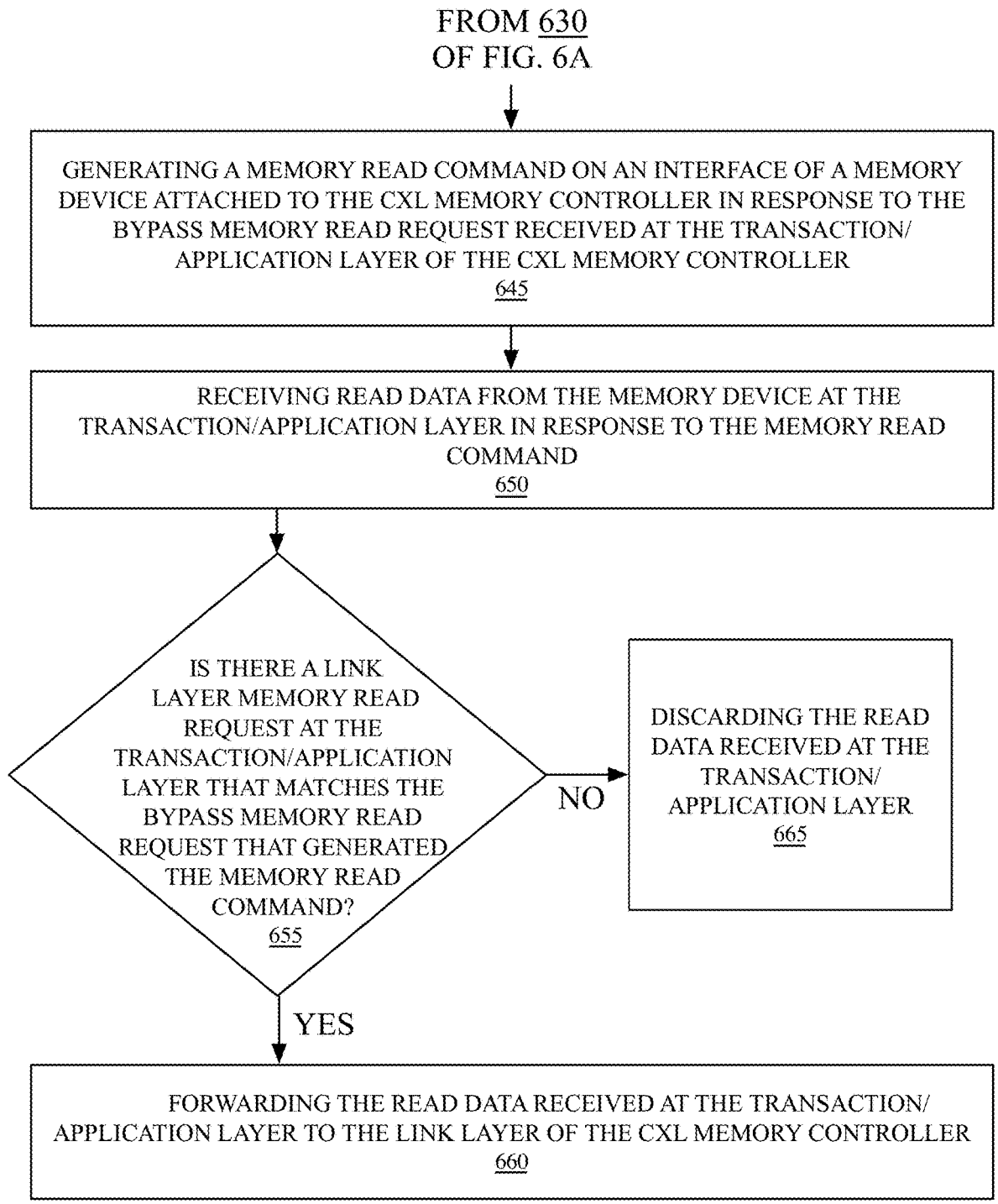
FIG. 6B is a continuation of the flow diagram of FIG. 6A illustrating an example method for reducing read latency in a CXL memory controller and for selectively discarding bypass memory read requests.

FIG. 6A and FIG. 6B are a set of flow diagrams 600 illustrating an example method for reducing read latency in a CXL memory controller and for selectively discarding bypass memory read requests.

At operation 605, the method begins by receiving a plurality of Compute Express Link (CXL) flow control units (flits) at a physical layer of a CXL memory controller. With reference to FIG. 1, a CXL physical layer 110 of the CXL memory controller 100 may receive a plurality of flits.

At operation 610, the method continues by transmitting each of the received plurality of CXL flits to read bypass detection logic of the CXL memory controller and at operation 615 by analyzing each of the plurality of CXL flits at the read bypass detection logic to identify a bypass memory read request from the plurality of CXL flits. With reference to FIG. 1, the plurality of CXL flits 108 may be received at the read bypass detection logic 115 of the CXL memory controller 100 and the read bypass detection logic 115 may analyze each of the plurality of CXL flits 108 at the read bypass detection logic to identify a bypass memory read request from the plurality of CXL flits 108.

The method continues at operation 620 by transmitting the bypass memory read request over a read request bypass path directly to a transaction/application layer of the CXL memory controller, wherein the read request bypass path does not include an arbitration/multiplexing layer and a link layer of the CXL memory controller. With reference to FIG. 1, the bypass memory read request may be transmitted over a read request bypass path 120 directly to the CXL.mem transaction/application layer 135 of the CXL memory controller 100, thereby bypassing the CXL.mem arbitration/multiplexing layer 125 and the 1 CXL.mem ink layer 130.

At operation 625, the method continues by determining if a read request queue of the CXL memory controller is empty. If it is determined that the read request queue of the CXL memory controller is empty at operation 625, then the method continues at operation 630. If it is determined that the read request queue of the CXL memory controller is not empty, then the method concludes at operation 635 by not generating a memory read command on the interface of the memory device attached to the CXL memory controller in response to the bypass memory read request and discarding the bypass memory read request. With reference to FIG. 1, the read request queue 137 may be determined to be empty or not empty by the CXL.mem transaction/application layer 135.

At operation 630, the method continues by determining if an address space of the bypass memory read request is valid. If the address space is determined to be valid, then the method continues at operation 645 of FIG. 6B. If it is determined that the address space of the bypass memory read request is not valid, the method concludes at operation 640 by discarding the bypass memory read request. With reference to FIG. 1, the transaction/application layer 135 may determine if the address space of the bypass memory read request is valid and if not, discard the bypass memory read request.

The method continues at operation 645 by generating a memory read command on an interface of a memory device attached to the CXL memory controller in response to the bypass memory read request received at the transaction/application layer of the CXL memory controller and at operation 650 by receiving read data from the memory device at the transaction layer in response to the memory read command. With reference to FIG. 1, a read command may be generated by the CXL.mem transaction/application layer 135 of the CXL memory controller 100 in response to receiving the bypass memory read request. The read command may then be forwarded to the memory controller and physical layer 140. The memory controller and physical layer 140 may then generate a memory read command on an interface 147 of a memory device 145. As such, a memory read command is generated on the interface of a memory device attached to the CXL memory controller in response to the bypass memory read request received at the transaction/application layer 135 of the CXL memory controller 100 and read data may be received from the memory device 145.

At operation 655 it is determined if there is a link layer memory read request at the transaction/application layer that matches the bypass memory read request that generated the memory read command. If there is a matching link layer memory read request, then the method concludes at operation 660 by forwarding the read data received at the transaction/application layer to the link layer of the CXL memory controller 360. If there is not a matching link layer memory read request, then method concludes at operation 665 by discarding the read data received at the transaction/application layer. With reference to FIG. 1, if there is a memory read request from the CXL.mem link layer 130 that matches the bypass memory read request at the CXL.mem transaction/application layer 135, then the CXL.mem transaction/application layer 135 forwards the read data to the CXL.mem link layer 130. Alternatively, if there is not a matching link layer memory read request at the CXL.mem transaction/application layer 135, then the CXL.mem transaction/application 135 discards the read data from the memory device.

Figure 7:
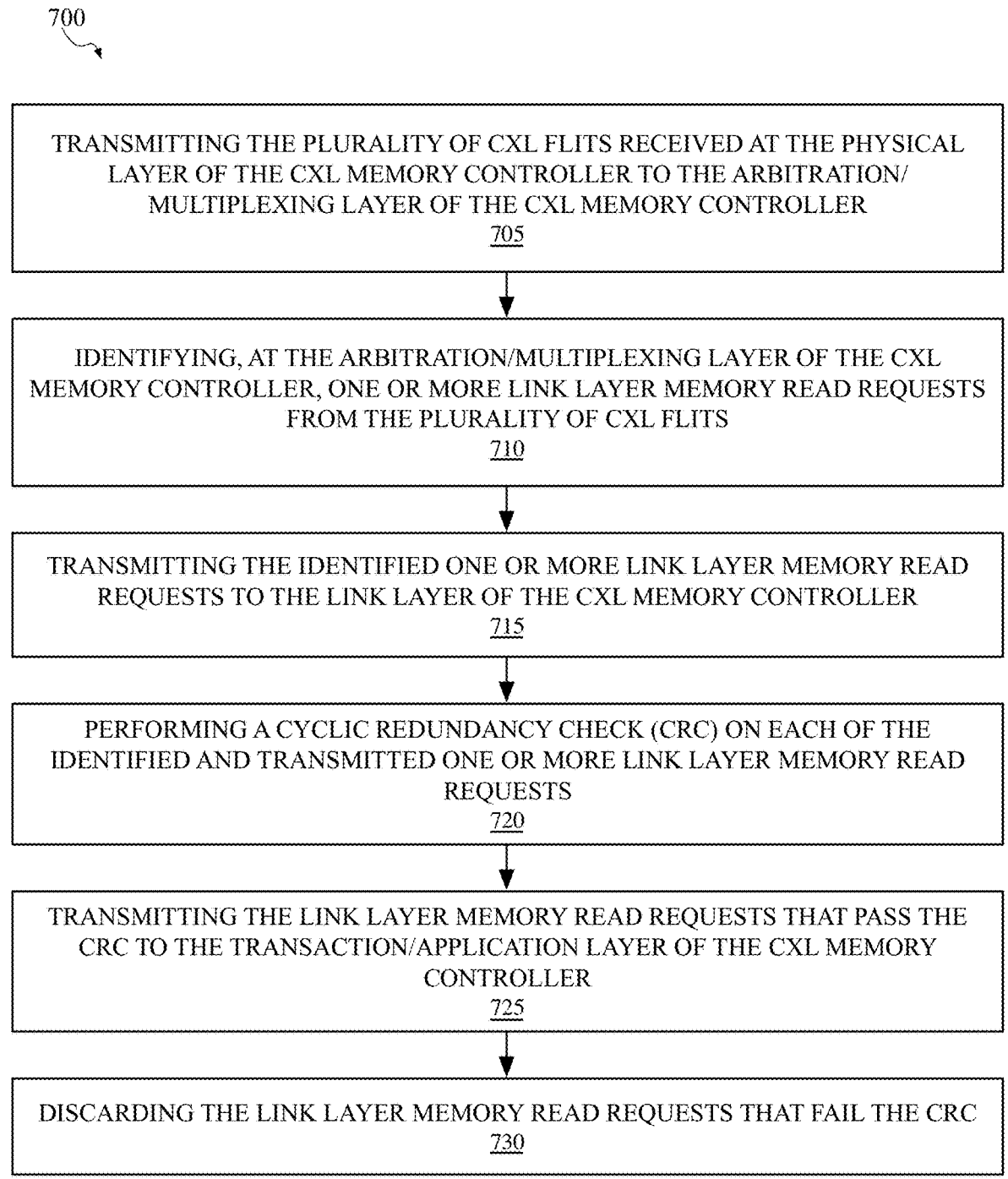
FIG. 7 is a flow diagram illustrating an example method for reducing read latency in a CXL memory controller and for selectively discarding link layer memory read requests.

FIG. 7 is a flow diagram illustrating an example method 700 for reducing read latency in a CXL memory controller and for selectively discarding link layer memory read requests.

At operation 705, the method begins by transmitting the plurality of CXL flits received at the physical layer of the CXL memory controller to the arbitration/multiplexing layer of the CXL memory controller. With reference to FIG. 1, the CXL flits 108 received at the CXL physical layer 110 are transmitted to the CXL.mem arbitration/multiplexing layer 125.

The method continues at operation 710 by identifying, at the arbitration/multiplexing layer of the CXL memory controller, one or more link layer memory read requests from the plurality of CXL flits, at operation 715 by transmitting the identified one or more link layer memory read requests to the link layer of the CXL memory controller, at operation 720 by performing a cyclic redundancy check (CRC) on each of the identified and transmitted one or more link layer memory read requests, and at operation 725 by transmitting the link layer memory read requests that pass the CRC to the transaction/application layer of the CXL memory controller. The method concludes at operation 730 by discarding the link layer memory read requests that fail the CRC. With reference to FIG. 1, the CXL.mem arbitration/multiplexing layer 135 may identify one or more link layer memory read requests from the CXL flits 108 and transmit the identified one or more link layer memory read request to the CXL.mem link layer 130. A CRC check may be performed on the identified one or more link layer memory read request and the link layer memory read request that fail the CRC may be discarded.

Figure 8A:
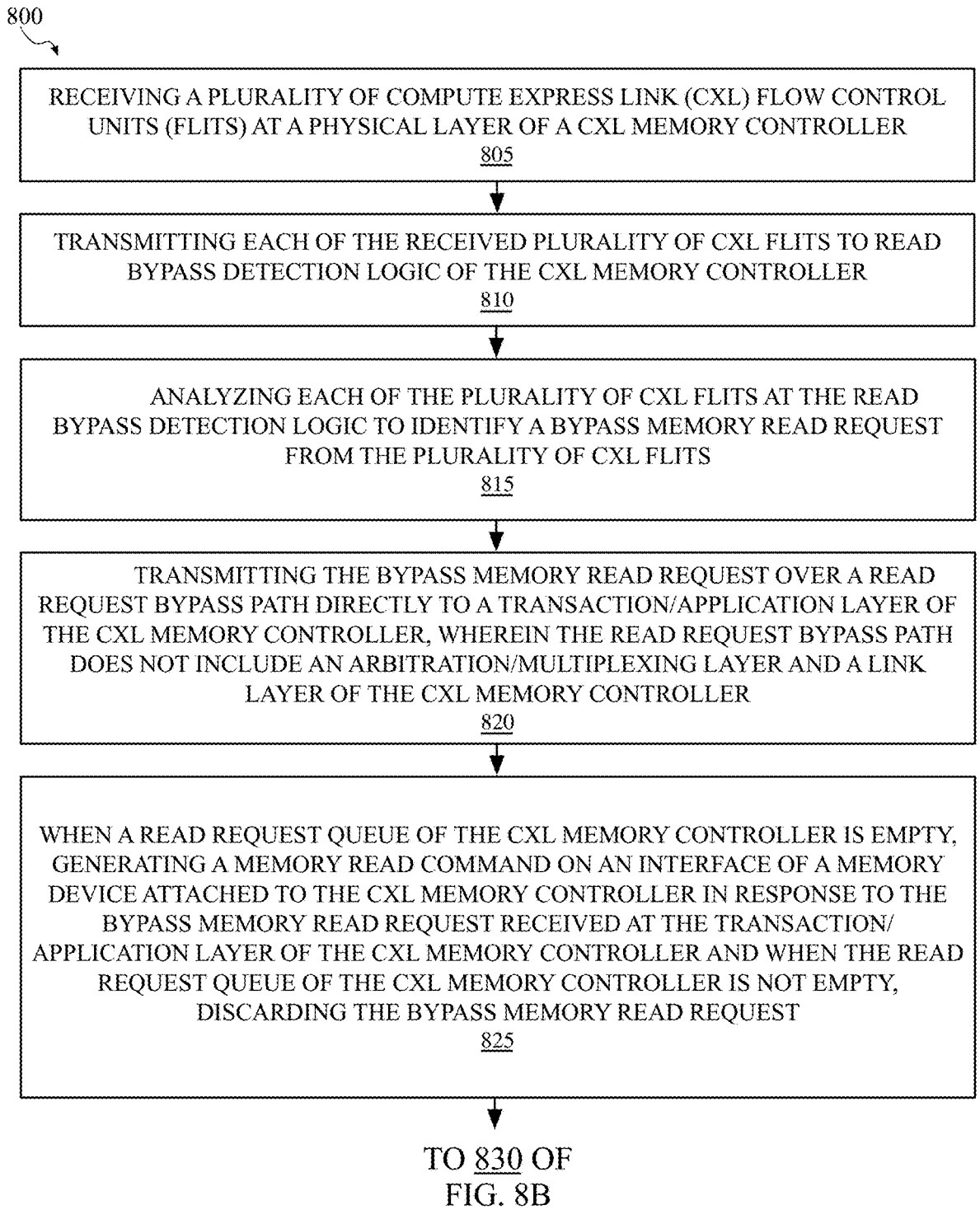
FIG. 8A is a flow diagram illustrating an example method for reducing read latency in a CXL memory controller and for matching link layer memory read requests to bypass memory read requests.

FIG. 8A and FIG. 8B are a set of flow diagrams 800 illustrating a method for reducing read latency in a CXL memory controller and for matching link layer memory read requests to bypass memory read requests, in accordance with an example of the present invention.

At operation 805, the method begins by receiving a plurality of Compute Express Link (CXL) flow control units (flits) at a physical layer of a CXL memory controller. With reference to FIG. 1, a CXL physical layer 110 of the CXL memory controller 100 may receive a plurality of flits 108.

At operation 810, the method continues by transmitting each of the received plurality of CXL flits to read bypass detection logic of the CXL memory controller and at operation 815 by analyzing each of the plurality of CXL flits at the read bypass detection logic to identify a bypass memory read request from the plurality of CXL flits. With reference to FIG. 1, the plurality of CXL flits 108 may be received at the read bypass detection logic 115 of the CXL memory controller 100 and the read bypass detection logic 115 may analyze each of the plurality of CXL flits 108 at the read bypass detection logic 115 to identify a bypass memory read request from the plurality of CXL flits 108.

The method continues at operation 820 by transmitting the bypass memory read request over a read request bypass path directly to a transaction/application layer of the CXL memory controller, wherein the read request bypass path does not include an arbitration/multiplexing layer and a link layer of the CXL memory controller. With reference to FIG. 1, the bypass memory read request may be transmitted over a read request bypass path 120 directly to the CXL.mem transaction/application layer 135 of the CXL memory controller 100, thereby bypassing the CXL.mem arbitration/multiplexing layer 125 and the CXL.mem link layer 130.

At operation 825, the method continues, when a read request queue of the CXL memory controller is empty, generating a memory read command on an interface of a memory device attached to the CXL memory controller in response to the bypass memory read request received at the transaction/application layer of the CXL memory controller and when the read request queue of the CXL memory controller is not empty, discarding the bypass memory read request. With reference to FIG. 1, when a read request queue 137 of the CXL memory controller 100 is empty, a memory read command may be generated on an interface 147 of a memory device 145 in response to the bypass memory read request received at the transaction/application layer 135 of the CXL memory controller 100. Alternatively, when the read request queue 137 is not empty, the transaction/application layer 135 may discard the bypass memory read request before generating the memory read command on the interface 147 of the memory device 145.

At operation 830, the method continues by receiving read data from the memory device at the transaction/application layer in response to the memory read command and the method concludes at operation 835, when there is a link layer memory read request at the transaction/application layer that matches the bypass memory read request that generated the memory read command, forwarding the read data received at the transaction/application layer to the link layer of the CXL memory controller. Additionally, if there is not a link layer memory read request at the transaction/application layer that matches the bypass memory read request that generated the memory read command, the read data received at the transaction/application layer is discarded. With reference to FIG. 1, read data received from the memory device 145 at the CXL.mem transaction/application layer 135 in response to the memory read command is forwarded to the CXL.mem link layer 130 of the CXL memory controller 100 when there is a link layer memory read request at the CXL.mem transaction/application layer 135 that matches the bypass memory read request that generated the memory read command. Alternatively, the CXL.mem transaction/application 135 discards the read data when there is not a link layer memory read request at the transaction/application layer 135 that matches the bypass memory read request that generated the memory read command.

In various examples, portions of the system of the present examples may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, a network processor, a microcontroller or general-purpose computer.

Unless specifically stated otherwise as apparent from the discussion, it is appreciated that throughout the description, discussions utilizing terms such as "receiving", "determining", "generating", "limiting", "sending", "counting", "classifying", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present examples may be embodied on various computing platforms that perform actions responsive to software-based instructions. The following provides an antecedent basis for the information technology that may be utilized to enable the present examples.

The method of the present examples may be stored on a computer readable medium which may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present example may be written in any combination of one or more programming languages, including an object-oriented programming language such as Java, C#, C++, Visual Basic or the like and conventional procedural programming languages, such as the "C" programming language or similar programming languages.

Aspects of the present examples are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, processor, or other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Further, for purposes of discussing and understanding the examples, it is to be understood that various terms are used by those knowledgeable in the art to describe techniques and approaches. Furthermore, in the description, for purposes of explanation, numerous specific details are set forth in order to provide a thorough understanding. It will be evident, however, to one of ordinary skill in the art that the present examples may be practiced without these specific details. In some instances, well-known structures and devices are shown in block diagram form, rather than in detail. These examples are described in sufficient detail to enable those of ordinary skill in the art to practice the examples, and it is to be understood that other examples may be utilized, and that logical, mechanical, electrical, and other changes may be made without departing from the scope.

What is claimed is:

1. A method for bypass memory read request detection, the method comprising:
   receiving a plurality of data packets at a physical layer of a CXL memory controller;
   deriving a plurality of Compute Express Link (CXL) flow control units (flits) from the plurality of data packets received at the physical layer of a CXL memory controller;
   transmitting each of the received plurality of CXL flits to read bypass detection logic of the CXL memory controller;
   analyzing each of the plurality of CXL flits at the read bypass detection logic to identify a bypass memory read request from the plurality of CXL flits;
   transmitting the bypass memory read request over a read request bypass path directly to a transaction/application layer of the CXL memory controller, wherein the read request bypass path does not include an arbitration/multiplexing layer and a link layer of the CXL memory controller;
   when a read request queue of the CXL memory controller is empty, generating a memory read command on an interface of a memory device attached to the CXL memory controller in response to the bypass memory read request received at the transaction/application layer of the CXL memory controller;
   receiving read data from the memory device at the transaction/application layer in response to the memory read command; and
   when there is a link layer memory read request at the transaction/application layer that matches the bypass memory read request that generated the memory read command, forwarding the read data received at the transaction/application layer to the link layer of the CXL memory controller.

2. The method of claim 1, comprising, when there is not a link layer memory read request at the transaction/application layer that matches the bypass memory read request that generated the memory read command, discarding the read data received at the transaction/application layer.

3. The method of claim 1, wherein analyzing each of the plurality of CXL flits at the read bypass detection logic of the CXL memory comprises detecting a master to subordinate (M2S) request having a memory read operation code in the CXL flit to identify the bypass memory read request.

4. The method of claim 1, comprising, when the read request queue of the CXL memory controller is not empty, not generating the memory read command on the interface of the memory device attached to the CXL memory controller and discarding the bypass memory read request.

5. The method of claim 1, comprising, discarding the link layer memory read request that matches the bypass memory read request that generated the memory read command.

6. The method of claim 1, comprising, discarding the bypass memory read request at the transaction/application layer and not generating the memory read command on the memory device interface when an address space of the bypass memory read request is not valid.

7. The method of claim 1, comprising, transmitting an activate command on the memory device interface prior to generating the memory read command on the memory device interface.

8. The method of claim 1, comprising:
   transmitting the plurality of CXL flits received at the physical layer of the CXL memory controller to the arbitration/multiplexing layer of the CXL memory controller;
   identifying, at the arbitration/multiplexing layer of the CXL memory controller, one or more link layer memory read requests from the plurality of CXL flits;
   transmitting the identified one or more link layer memory read requests to the link layer of the CXL memory controller;
   performing a cyclic redundancy check (CRC) on each of the identified and transmitted one or more link layer memory read requests;
   transmitting the link layer memory read requests that pass the CRC to the transaction/application layer of the CXL memory controller; and
   discarding the link layer memory read requests that fail the CRC.

9. The method of claim 1, wherein the memory device attached to the CXL memory controller is a Double Data Rate (DDR) memory device.

10. A method for reading a memory device, the method comprising:
    receiving a plurality of Compute Express Link (CXL) flow control units (flits) at a physical layer of a CXL memory controller;
    transmitting each of the received plurality of CXL flits to read bypass detection logic of the CXL memory controller;
    analyzing each of the received and transmitted plurality of CXL flits at the read bypass detection logic to identify a bypass memory read request from the plurality of CXL flits, wherein the bypass memory read request comprises an address space;
transmitting the bypass memory read request over a read request bypass path directly to a transaction/application layer of the CXL memory controller, wherein the read request bypass path does not include an arbitration/multiplexing layer and a link layer of the CXL memory controller;
discarding the bypass memory read request at the transaction/application layer when the address space of the bypass memory read request is not valid;
when a read request queue of the CXL memory controller is empty, generating a memory read command on an interface of a memory device attached to the CXL memory controller in response to the bypass memory read request received at the transaction/application layer of the CXL memory controller and when the read request queue of the CXL memory controller is not empty, discarding the bypass memory read request;
receiving read data from the memory device at the transaction/application layer in response to the memory read command; and
when there is a link layer memory read request at the transaction/application layer that matches the bypass memory read request that generated the memory read command, forwarding the read data received at the transaction/application layer to the link layer of the CXL memory controller and when there is not a link layer memory read request at the transaction/application layer that matches the bypass memory read request that generated the memory read command, discarding the read data received at the transaction/application layer.

11. The method of claim 10, comprising:
transmitting the plurality of CXL flits received at the physical layer of the CXL memory controller to the arbitration/multiplexing layer of the CXL memory controller;
identifying, at the arbitration/multiplexing layer of the CXL memory controller, one or more link layer memory read requests from the plurality of CXL flits;
transmitting the identified one or more link layer memory read requests to the link layer of the CXL memory controller; and
performing a cyclic redundancy check (CRC) on each of the one or more link layer memory read requests;
transmitting the link layer memory read requests that pass the CRC to the transaction/application layer of the CXL memory controller; and
discarding the link layer memory read requests that fail the CRC.

12. A compute express link (CXL) memory controller comprising:
read bypass detection logic to receive a plurality of CXL flits from a CXL physical layer of a CXL memory controller and to analyze each of the received plurality of CXL flits to identify a bypass memory read request from the plurality of CXL flits;
a read request bypass path comprising the read bypass detection logic, the read request bypass path connecting the CXL physical layer to a transaction/application layer of the CXL memory controller, the read request bypass path bypassing an arbitration/multiplexing layer of the CXL memory controller and a link layer of the CXL memory controller;
the transaction/application layer to:

generate a memory read command on an interface of a memory device associated with the CXL memory controller in response to the bypass memory read request received at the transaction/application layer when a read request queue is empty;
receive read data from the memory device in response to the memory read command; and
forward the read data received at the transaction/application layer to the link layer when there is a link layer memory read request at the transaction/application layer that matches the bypass memory read request that generated the memory read command.

13. The CXL memory controller of claim 12, wherein the read bypass detection logic to analyze each of the plurality of CXL flits by detecting a master to subordinate (M2S) request having a memory read operation code in the CXL flit to identify the bypass memory read request.

14. The CXL memory controller of claim 12, wherein the transaction/application layer to discard the read data received at the transaction/application layer when there is not a link layer memory read request at the transaction/application layer that matches the bypass memory read request that generated the memory read command.

15. The CXL memory controller of claim 12, wherein the transaction/application layer to not generate the memory read command on the interface of the memory device when the read request queue is not empty and to discard the bypass memory read request.

16. The CXL memory controller of claim 12, wherein the transaction/application layer to discard the link layer memory read request that matches the bypass memory read request that generated the memory read command.

17. The CXL memory controller of claim 12, wherein the transaction/application layer to discard the bypass memory read request and to not generate the memory read command on the memory device interface when an address space of the bypass memory read request is not valid.

18. The CXL memory controller of claim 12, wherein the transaction/application layer to transmit an activate command on the memory device interface prior to generating the memory read command on the memory device interface.

19. The CXL memory controller of claim 12, comprising:
the physical layer of the CXL memory controller to receive the plurality of CXL flits, to transmit the plurality of CXL flits to the read bypass detection logic and to transmit the plurality of CXL flits to the arbitration/multiplexing layer of the CXL memory controller;
the arbitration/multiplexing layer to identify one or more link layer memory read requests from the plurality of CXL flits and to transmit the one or more link layer memory read requests to the link layer; and
the link layer to perform a cyclic redundancy check (CRC) on each of the one or more link layer memory read requests, to transmit the link layer memory read requests that pass the CRC to the transaction/application layer of the CXL memory controller and to discard the link layer memory read requests that fail the CRC.

20. The CXL memory controller of claim 12, wherein the memory device is a Double Data Rate (DDR) memory device.

* * * * *